United States Patent
Claywell et al.

(10) Patent No.: US 10,584,629 B2
(45) Date of Patent: Mar. 10, 2020

(54) CHARGE AIR COOLER SYSTEM

(71) Applicant: GM GLOBAL TECHNOLOGY OPERATIONS LLC, Detroit, MI (US)

(72) Inventors: Mark R. Claywell, Birmingham, MI (US); Maqsood Rizwan Ali Khan, Rochester Hills, MI (US); Jacob C. Hedrick, Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 136 days.

(21) Appl. No.: 15/895,205

(22) Filed: Feb. 13, 2018

(65) Prior Publication Data
US 2019/0249593 A1    Aug. 15, 2019

(51) Int. Cl.
*F02B 29/04* (2006.01)
*F02M 35/10* (2006.01)
*F02M 35/116* (2006.01)

(52) U.S. Cl.
CPC ... *F02B 29/0431* (2013.01); *F02M 35/10268* (2013.01); *F02M 35/10295* (2013.01); *F02M 35/116* (2013.01)

(58) Field of Classification Search
CPC .............. F02B 29/0412; F02B 29/0462; F02B 29/0437; F02B 29/04; F02B 29/0431; F02M 35/116; F02M 35/10295; Y02T 10/146
See application file for complete search history.

(56) References Cited

U.S. PATENT DOCUMENTS

| | | | |
|---|---|---|---|
| 1,818,283 A * | 8/1931 | Spencer | F02M 35/10078 123/184.38 |
| 3,018,767 A | 1/1962 | Sailler | |
| 7,275,511 B1 | 10/2007 | Wright et al. | |
| 7,953,540 B2 * | 5/2011 | Ito | F02M 26/38 701/103 |
| 8,813,728 B2 * | 8/2014 | Wong | F02B 29/0462 123/184.21 |
| 9,726,121 B2 * | 8/2017 | Foege | F02M 26/08 |
| 9,995,256 B2 * | 6/2018 | Claywell | F02B 29/0437 |
| 2012/0017877 A1 * | 1/2012 | Laube | F02B 29/0412 123/542 |
| 2014/0209073 A1 * | 7/2014 | Johnson | F02B 37/16 123/568.12 |
| 2014/0290629 A1 * | 10/2014 | Claywell | F02M 35/1045 123/542 |
| 2017/0191453 A1 | 7/2017 | Claywell et al. | |

* cited by examiner

*Primary Examiner* — Jesse S Bogue
(74) *Attorney, Agent, or Firm* — Cantor Colburn LLP

(57) ABSTRACT

The present disclosure provides a charge air cooler system having a manifold charge air cooler, a first charge air cooler and a second charge air cooler wherein each charge air cooler are in fluid communication with each other. The manifold charge air cooler is within a plenum and defines a first chamber and a second chamber within the plenum. The manifold charge air cooler is configured to cool of unsteady flow between the first and second chambers. The first charge air cooler may be configured to cool a first ambient air flow and may be in fluid communication with the first chamber. The second charge air cooler may be configured to cool a second ambient air flow wherein the second charge air cooler is in fluid communication with the second chamber.

14 Claims, 4 Drawing Sheets

CHARGE AIR COOLER SYSTEM

TECHNICAL FIELD

The present disclosure relates to an internal combustion engine assembly having a charge air cooler system for a vehicle which improves engine performance and efficiency.

BACKGROUND

Internal combustion engines (ICE's) are often called upon to generate considerable levels of power for prolonged periods of time on a dependable basis. Many such engines employ forced induction via a gas compressor, such as a turbocharger or a supercharger, to pressurize ambient airflow for entry into combustion chambers of the ICE in order to boost the engine's power and efficiency.

Forced induction engines frequently employ charge-air coolers or heat exchangers to further enhance the engine's volumetric efficiency by increasing density of an intake air charge through nearly isobaric, i.e., constant pressure, cooling. Typically, such a charge-air cooler is situated between the compressor of a turbocharger and the intake manifold in order to cool the pressurized air prior to its entry into the engine's combustion chambers.

SUMMARY

The present disclosure provides a charge air cooler system having a manifold charge air cooler, a first charge air cooler and a second charge air cooler. The manifold charge air cooler is within a plenum and defines a first chamber and a second chamber within the plenum. The manifold charge air cooler is configured to cool of unsteady flow between the first and second chambers. The first charge air cooler may be configured to cool a first ambient air flow and may be in fluid communication with the first chamber. The second charge air cooler may be configured to cool a second ambient air flow wherein the second charge air cooler is in fluid communication with the second chamber.

In the first embodiment, the first charge air cooler is in fluid communication with a first gas compressor which is configured to pressurize a first ambient airflow for delivery to the first chamber. The first charge air cooler may be disposed between the first gas compressor and the intake manifold. The second charge air cooler is in fluid communication with a second gas compressor which is configured to pressurize a second ambient airflow for delivery to the second chamber. The second charge air cooler may be disposed between the second gas compressor and the second chamber.

The charge air cooler assembly of the present disclosure may further include a radiator which is operatively configured to cool of an input coolant flow. The radiator may be in fluid communication with an input of the manifold charge air cooler, a first output of the first charge air cooler, and a second output of the second charge air cooler. Alternatively, in another arrangement, the radiator may be in fluid communication with an input of the manifold charge air cooler, a first input of the first charge air cooler, and a second input of the second charge air cooler. In this alternative arrangement of the charge air cooler assembly, the radiator may also be in fluid communication with an output of the manifold charge air cooler, a first output of the first charge air cooler, and a second output of the second charge air cooler.

The present disclosure further provides for an internal combustion engine assembly which includes an engine block, a cylinder head, an intake manifold, a manifold charge air cooler, first and second air compressors, first and second charge air coolers. The engine block may define a first bank and a second bank disposed across the first bank. Each of the first and second banks includes at least one cylinder (or combustion chamber). The cylinder head may be affixed to the engine block. The intake manifold may be affixed to the cylinder head wherein the intake manifold defines a plenum and a plurality of runners. The manifold charge air cooler may be disposed within the plenum such that the manifold charge air cooler defines a first chamber and a second chamber within the plenum. The first chamber may be in fluid communication with the first bank and the second chamber may be in fluid communication with second bank.

The first gas compressor of the engine assembly may be configured to pressurize a first ambient airflow for delivery to the first bank via a first charge air cooler and the intake manifold. The first charge air cooler may be disposed between the first gas compressor and the intake manifold. The second gas compressor may be configured to pressurize a second ambient airflow for delivery to the second bank via a second charge air cooler and the intake manifold. The second charge aft cooler may be disposed between the second gas compressor and the intake manifold. The manifold charge air cooler of the engine assembly may be operatively configured to cool an unsteady airflow between the first and second chamber. Moreover, the manifold charge air cooler may be in fluid communication with the first and second charge air coolers. The manifold charge air cooler is also configured to enable the unsteady airflow to pass between the first and second chambers.

The engine assembly of the present disclosure may further include a radiator which is operatively configured to cool of an input coolant flow. The radiator may be in fluid communication with an input of the manifold charge air cooler, a first output of the first charge air cooler, and a second output of the second charge air cooler.

In an alternative arrangement for the engine assembly, the radiator may be in fluid communication with an input of the manifold charge air cooler, a first input of the first charge air cooler, and a second input of the second charge air cooler. In this alternative arrangement, radiator is also in fluid communication with the output of the manifold charge air cooler, a first output of the first charge air cooler, and a second output of the second charge air cooler.

With respect to all embodiments of the present disclosure, the manifold charge air cooler may or may not span the entire length of the of intake manifold. In cases where the manifold charge air cooler does not span the entire length of the intake manifold, intake manifold may further include a baffle wall wherein the manifold charge air cooler and the baffle wall define the first and second chambers.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1:
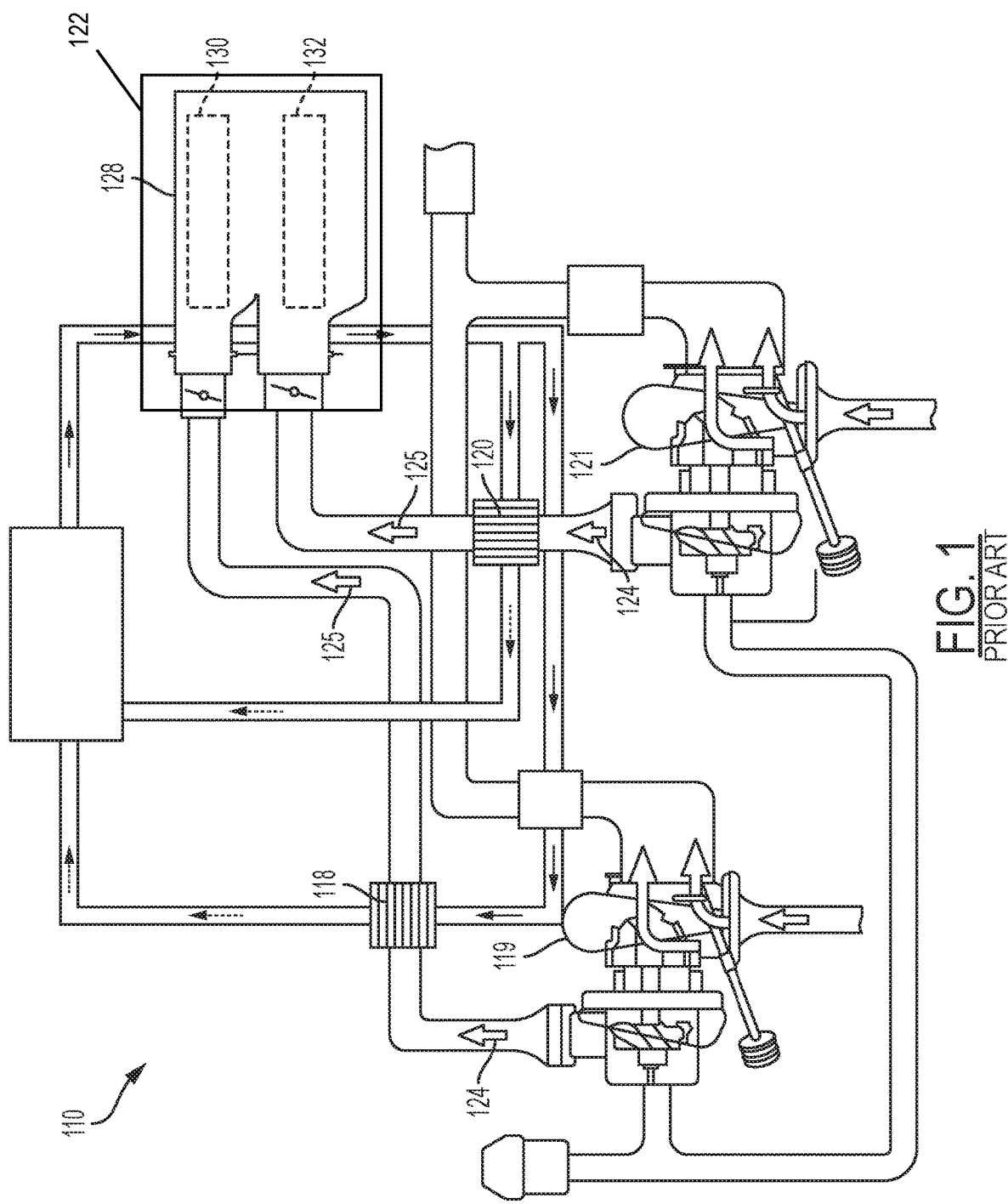
FIG. 1 is a schematic diagram of a traditional twin turbocharged engine system having a traditional charge air cooler system.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The operation principle for turbo boost engines is that the exhaust air to drive a turbine blade, and the air compressor disposed in one end of the turbine axis is used to compress the intake air before it enters the combustion chambers. The compressed air is provided to the internal combustion engine for burning. Intercoolers 118, 120 shown in FIG. 1 may accordingly implemented when twin turbochargers 119, 121 are used in a traditional engine assembly 110. The intercoolers 118, 120 are each a heat exchanger which is used to cool air 124 which has been compressed by a turbocharger 119, 121 (or a supercharger) for the engine.

An intercooler 118, 120 is generally placed somewhere in the path of air that flows from the turbo/supercharger 119, 121 to the motor 122, and is typically a separate unit proximate to the engine as shown in FIG. 1. Intercoolers 118, 120 are generally implemented to cool excessively hot air before the air enters the combustion chambers an engine 122. Hot air is less dense and therefore contains less molecules of oxygen per unit volume. Accordingly, with hot air, there is less air for the motor in a given stroke and less power produced. Moreover, hot air also causes a higher combustion chamber (or cylinder) temperature which can aid in pre-detonation of the combustion cycle which results in inefficient engine operations. An intercooler 118, 120 for each turbocharger 119, 121 may be used in an engine assembly 110 in order cool the intake air.

The air intake manifold 128 may direct incoming cooled air 125 from the intercoolers 118, 120 to the respective engine cylinders 130, 132 of a combustion engine 122. The air intake manifold 128 may be been fabricated from metal or molded materials such as thermoplastics, resins, and polymers. Preferred materials may include nylon or other polyamides which may further include filler materials such as glass fibers. However, some turbulence in the intake manifold is provided in the form of an unsteady flow within the plenum of the air intake manifold. It is understood that residual heat remains in the unsteady flow.

Figure 2:
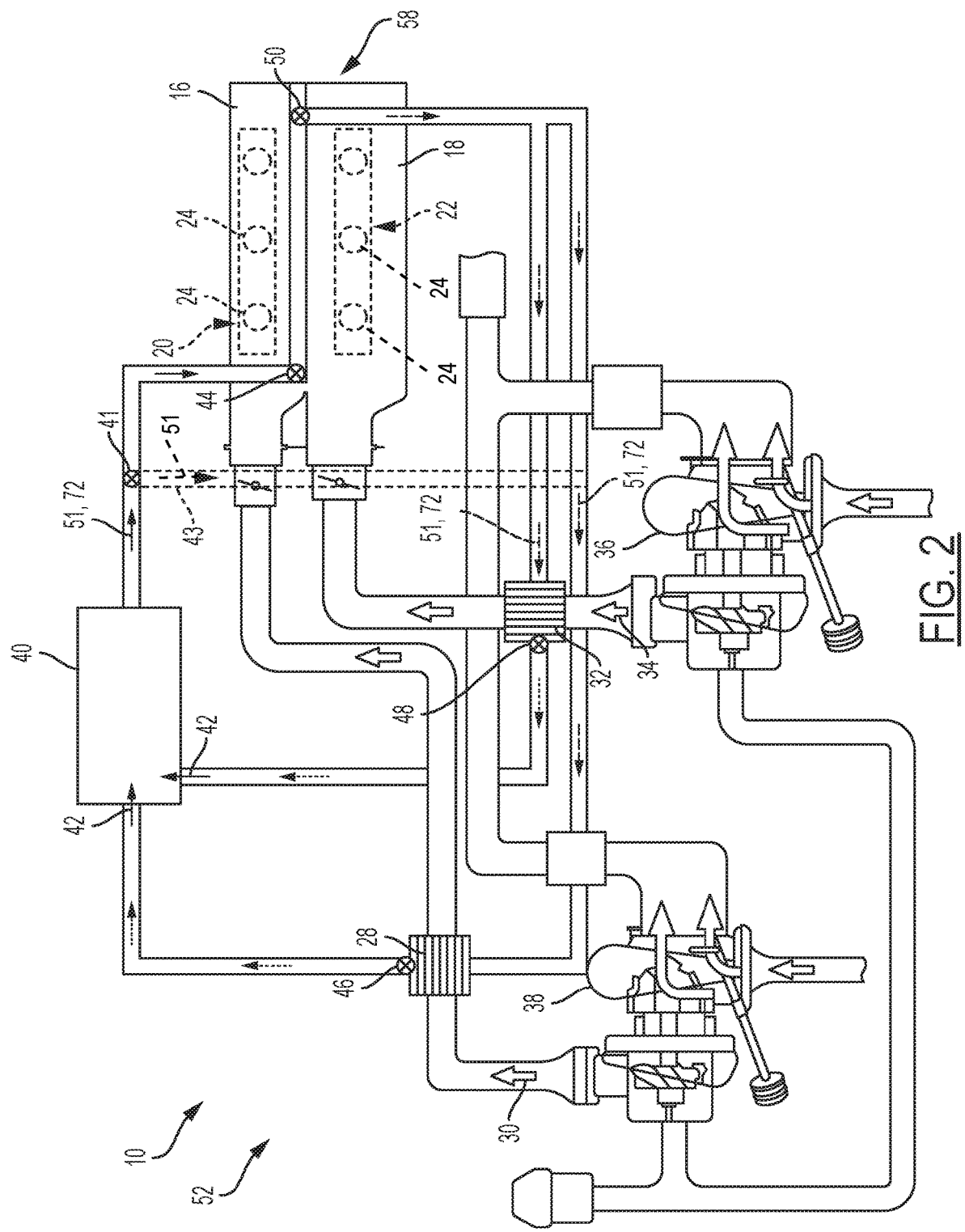
FIG. 2 is a schematic diagram of a first embodiment of the present disclosure.
Figure 3:
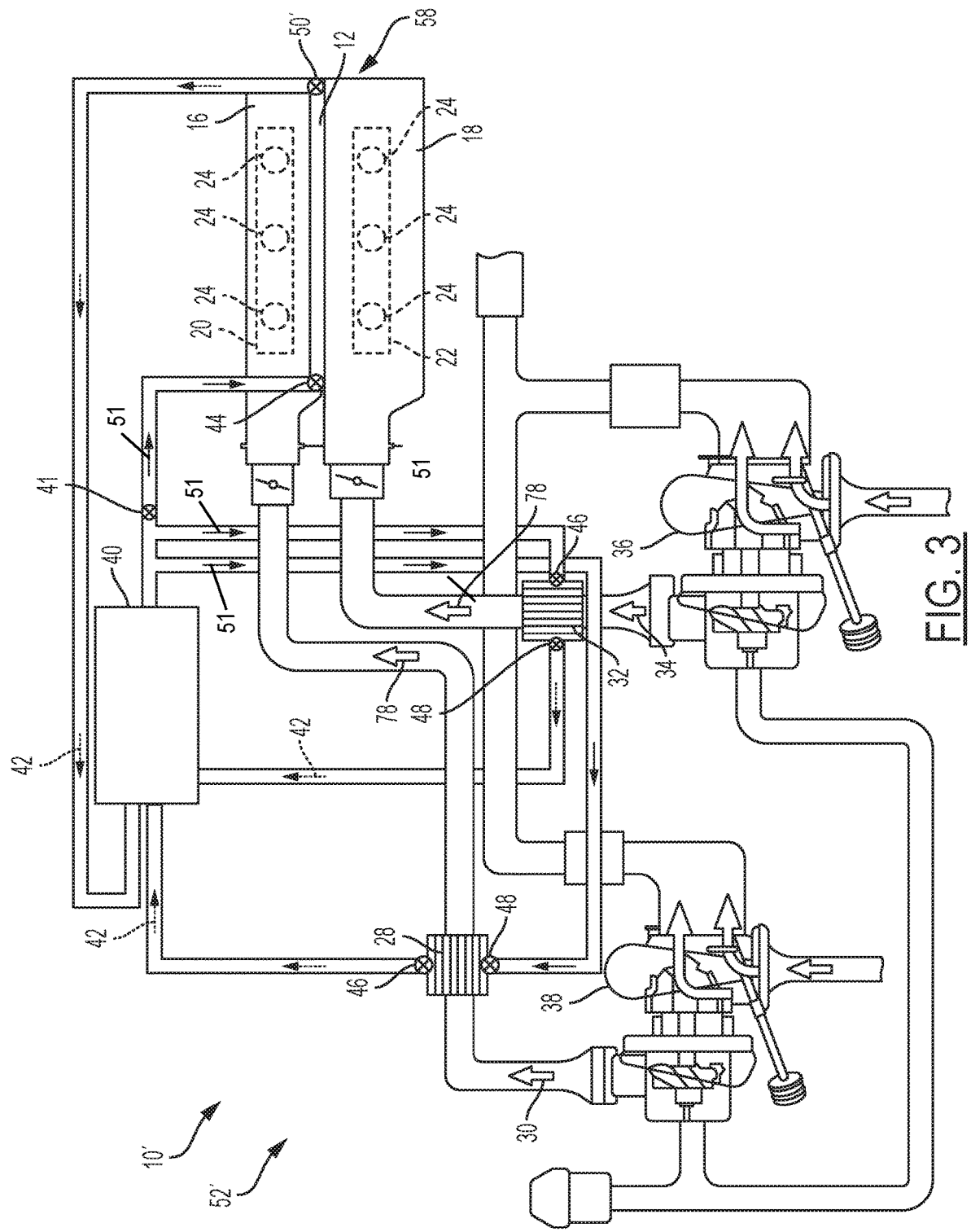
FIG. 3 is a schematic diagram of a second embodiment of the present disclosure.
Figure 4:
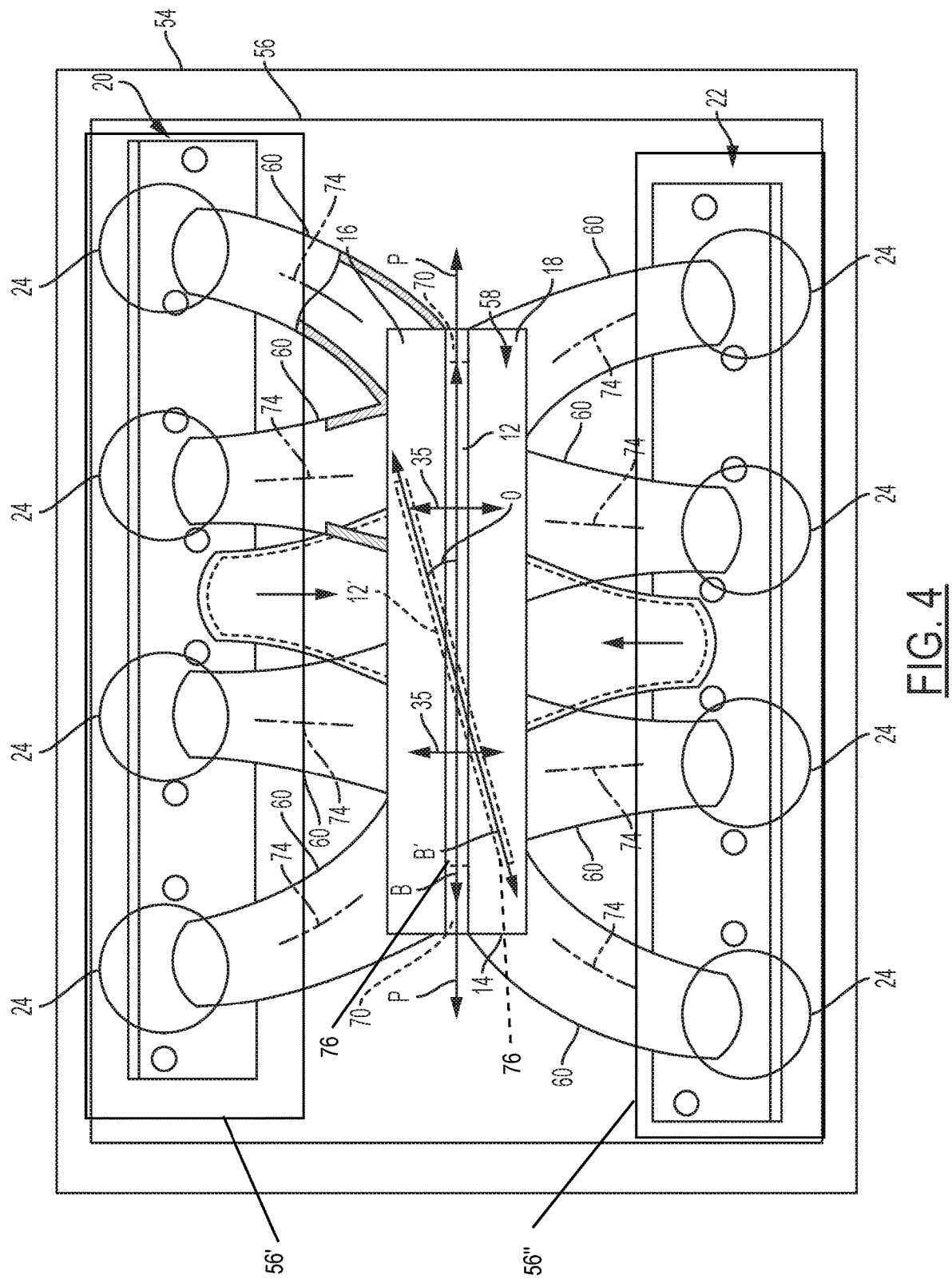
FIG. 4 is a schematic diagram of a plan view of the intake manifold and engine block according various embodiments of the present disclosure.

Accordingly, the present disclosure further improves engine performance and efficiency by better cooling the airflow. The charge air cooling system 10 further reduces the temperature of the unsteady air flow 35 (FIG. 4) within the plenum. Referring now to FIGS. 2 and 3, the charge air cooler system 10 of the present disclosure includes a manifold charge air cooler 12, a first charge air cooler 28 and a second charge air cooler 32. The manifold charge air cooler 12 is disposed within a plenum 14 and defines a first chamber 16 and a second chamber 18 within the plenum 14 (FIG. 4). The manifold charge air cooler 12 is configured to cool of unsteady flow 35 between the first and second chambers 16,18. The first charge air cooler 28 may be configured to cool a first ambient air flow 30 and may be in fluid communication with the first chamber 16. The second charge air cooler 32 may be configured to cool a second ambient air flow 34 wherein the second charge air cooler 32 is in fluid communication with the second chamber 18.

In the first embodiment, the first charge air cooler 28 is in fluid communication with a first gas compressor 38 which is configured to pressurize a first ambient airflow for delivery to the first chamber 16. The first charge air cooler 28 may be disposed between the first gas compressor 38 and the intake manifold 58. The second charge air cooler 32 is in fluid communication with a second gas compressor 36 which is configured to pressurize a second ambient airflow 34 for delivery to the second chamber 18. The second charge air cooler 32 may be disposed between the second gas compressor 36 and the second chamber 18.

The charge air cooler assembly 10, 10' of the present disclosure may further include a radiator 40 which is operatively configured to cool of an input coolant flow 42. With reference to FIG. 2, the radiator 40 may be in fluid communication with an input 44 of the manifold charge air cooler 12, a first output 46 of the first charge air cooler 28, and a second output 48 of the second charge air cooler 32. The charge air cooler assembly of FIG. 2 is a configuration where the manifold charge air cooler is in series with the first and second charge air coolers (being in parallel with one another). The manifold charge air cooler therefore receives coolant at its coldest temperature. In this arrangement, each charge air cooler is in fluid communication with one another and therefore, provides for efficient use of the coolant from the radiator while better cooling airflow.

Alternatively, in another arrangement shown in FIG. 3, the radiator 40 may be in fluid communication with an input 44 of the manifold charge air cooler 12, a first input 48 of the first charge air cooler 28, and a second input 46 of the second charge air cooler 32. In this alternative arrangement of the charge air cooler assembly, the radiator 40 may also be in fluid communication with an output 50 of the manifold charge air cooler 12, a first output 46 of the first charge air cooler 28, and a second output 48 of the second charge air cooler 32. The charge air cooler assembly of FIG. 3 is a configuration where the manifold charge air cooler is in parallel with the first and second charge air coolers. The center, first and second charge air coolers therefore each receive coolant at its coldest temperature. Similar to the aforementioned "series" arrangement, each charge air cooler is in fluid communication with one another and therefore, provides for efficient use of the coolant from the radiator while better cooling airflow.

The present disclosure further provides for an internal combustion engine assembly 52 which includes an engine block 54 (FIG. 4), a cylinder head 56 (FIG. 4), an intake manifold 58, a manifold charge air cooler 12, first and second air compressors, in addition to first and second charge air coolers 28, 32. It is understood that the first cylinder head 56' is shown for the first bank 20 of combustion chambers and the second cylinder head 56" is shown for the second bank 22 of combustion chambers. Both the first and second cylinder heads 56', 56" may be collectively referenced as the engine cylinder head 56. The engine block 54 may define a first bank 20 and a second bank 22 disposed across from (opposite to) the first bank 20. Each of the first and second banks 20, 22 includes at least one cylinder (or combustion chamber). The cylinder head 56 may be affixed to the engine block 54. The intake manifold 58 may be affixed to the cylinder head 56 wherein the intake manifold 58 defines a plenum 14 and a plurality of runners 60. The manifold charge air cooler 12 may be disposed within the plenum 14 such that the manifold charge air cooler 12 defines a first chamber 16 and a second chamber 18 within the plenum 14. The first chamber 16 may be in fluid communication with the first bank 20 of combustion chambers 24 and the second chamber 18 may be in fluid communication with second bank 22 of combustion chambers 24.

The first gas compressor 38 of the engine assembly 52 may be configured to pressurize a first ambient airflow 30 for delivery to the first bank 20 via a first charge air cooler 28 and the intake manifold 58. The first charge air cooler 28 may be disposed between the first gas compressor 38 and the intake manifold 58. The second gas compressor 36 may be configured to pressurize a second ambient airflow for delivery to the second bank 22 via a second charge air cooler 32 and the intake manifold 58. The second charge air cooler 32 may be disposed between the second gas compressor 36 and the intake manifold 58. The manifold charge air cooler 12 of the engine assembly 52 may be operatively configured to cool an unsteady airflow 35 between the first and second chamber 18. Moreover, the manifold charge air cooler 12 may be in fluid communication with the first and second charge air coolers 28, 32. The manifold charge air cooler 12 is also configured to enable the unsteady airflow 35 to pass between the first and second chambers 16, 18.

As shown in FIG. 2, the engine assembly 52 of the present disclosure may further include a radiator 40 which is operatively configured to cool an input coolant flow 42. As shown in FIG. 2, the radiator 40 may be in fluid communication with an input 44 of the manifold charge air cooler 12, a first output 46 of the first charge air cooler 28, and a second output 48 of the second charge air cooler 32. In FIG. 2, the manifold charge air cooler is in series with the first and second charge air coolers (being in parallel with one another). The manifold charge air cooler therefore receives coolant at its coldest temperature. In this arrangement, each charge air cooler is in fluid communication with one another and therefore, provides for efficient use of the coolant from the radiator while better cooling airflow. As shown, an optional bypass valve 41 may be implemented so that under pre-determined conditions, the coolant from the radiator only flows to the first and second charge air coolers via optional tubing 43. The bypass valve 41 is configured to redirect a portion of the coolant 51 (or all of the coolant 51) away from the radiator to the first and second inputs 47, 49 of the first and second charge air coolers 28, 32.

In an alternative arrangement for the engine assembly 52' in FIG. 3, the radiator 40 may be in fluid communication with an input 44 of the manifold charge air cooler 12, a first input 47 of the first charge air cooler 28, and a second input 49 of the second charge air cooler 32. In this alternative arrangement, radiator 40 is also in fluid communication with the output 50 of the manifold charge air cooler 12, a first output 46 of the first charge air cooler 28, and a second output 48 of the second charge air cooler 32. In FIG. 3, the manifold charge air cooler is in parallel with the first and second charge air coolers. The center, first and second charge air coolers therefore each receive coolant at its coldest temperature. Similar to the aforementioned "series" arrangement, each charge air cooler is in fluid communication with one another and therefore, provides for efficient use of the coolant from the radiator while better cooling airflow. As shown in FIG. 3, an optional by-pass valve 41 may be implemented so that under pre-determined conditions, the coolant from the radiator only flows to the first and second charge air coolers via optional tubing 43. The bypass valve 41 of FIG. 3 is configured to redirect a portion of the coolant 51 (or all of the coolant 51) away from the radiator to the first and second inputs 47, 49 of the first and second charge air coolers 28, 32.

With respect to all embodiments of the present disclosure, the manifold charge air cooler 12 may or may not span the entire length of the intake manifold 58. In cases where the manifold charge air cooler 12 does not span the entire length of the intake manifold 58, the intake manifold 58 may further include a baffle wall 70 wherein the manifold charge air cooler 12 and the baffle wall 70 together define the first and second chambers 16, 18. The baffle wall 70 may or may not include apertures to allow unsteady airflow 35 to flow through the baffle wall in addition to the unsteady airflow 35 flowing through the heat exchanger section of the manifold charge air cooler 12. As shown in FIG. 4, the internal combustion engine assembly 52 of the present disclosure may include a cylinder block with a plurality of cylinders 24 arranged in the first and second banks 20, 22.

The engine assembly 52 may also include a plurality of intake valves (not shown) operatively connected to the cylinder head 56 and configured to control a supply of air to each cylinder 24 for combustion with fuel therein. The cylinder head 56 generally includes inlet ports for communicating the supply of air or air and fuel to the plurality of intake valves. The engine 52 may be configured as a spark-ignition internal combustion engine that employs a spark plug (not shown) to initiate combustion of the fuel and air mixture inside the combustion chambers. The engine assembly 52 may also additionally include a plurality of exhaust valves (not shown) operatively connected to the cylinder head 56 and configured to control removal of post-combustion gasses from each cylinder.

The engine assembly may also include a crankshaft (not shown) configured to rotate within the cylinder block. As known to those skilled in the art, the crankshaft is consecutively rotated by each of the pistons (not shown) in the combustion chambers as a result of an appropriately proportioned fuel-air mixture being selectively admitted into the combustion chambers via one or more intake valves operatively connected to the cylinder head 56, and then burned in the combustion chambers. In a continuous cycle, the rotation of the crankshaft also reciprocates the pistons via respective rods (not shown) as a result of combustion within the cylinders 24, including a first piston in a first cylinder and a second piston in a second cylinder.

The manifold charge air cooler 12 of the present disclosure can be incorporated into an intake manifold 58 (FIG. 2-4) which is mounted directly to the combustion chamber 24 (formed by the cylinder head 56 and engine block 54 shown in FIG. 4). As indicated, the manifold charge air cooler 12 is configured to cool the pressurized unsteady airflow 35, i.e., after the airflow was pressurized by either the first or second compressors, prior to delivery of the pressurized airflow to the cylinders 24. The first/second/manifold charge air coolers 12, 28, 32 may be configured as an air-to-liquid intercooler, where thermal energy is removed from the airflow via a dedicated coolant 72.

With respect to all embodiments of the present disclosure, manifold charge air cooler 12 is disposed within the intake manifold 58 and may be elongated along the manifold charge air cooler axis B (FIG. 4). The manifold charge air cooler axis B may define an oblique angle θ relative to the manifold axis P as shown in FIG. 4. Hence, the manifold charge air cooler axis B may be obliquely angled or aligned with the manifold axis P. For instance, the manifold charge air cooler 12 may be obliquely angled with respect to the manifold axis P to allow more intercooler surface area to be exposed to at least one of the cylinders 24 (FIG. 4), thus further improving cylinder-to-cylinder balance. The angular orientation of the manifold charge air cooler 12 may also be determined with respect to at least one of the runners 60 wherein each runner defines a runner center axis 74 (FIG. 4).

Moreover, the manifold charge air cooler 12 includes a heat-exchanger section 76 (FIG. 4) which may extend along the entire length of the manifold charge air cooler 12. The heat exchanger section 76 of the manifold charge air cooler is configured to cool the pressurized unsteady airflow 35 received at the within the plenum 14. As the warm unsteady airflow 35 moves through the heat exchanger section 76, the heat exchanger section 76 is configured to cool the warm unsteady airflow 35 before the airflow 35 is transferred to the cylinders 24 as part of intake flow. Accordingly, the intake manifold 58 directs the intake air 35 from the plenum to the combustion chambers.

As indicated, the intake manifold 58 defines a plurality of ports/runners 60 operable to direct the intake air to the cylinders 24. As used herein, the term "runners" includes without limitation openings and holes capable of establishing fluid communication between the intake manifold 58 and the combustion chamber 24. Each port/runner 60 is disposed in fluid communication with a respective combustion chamber 24. Thus, the intake manifold 58 of all embodiments of the present disclosure may have a plenum 14 which is integral to the plurality of runners 60. The plenum 14 may be elongated along a manifold axis P (FIG. 4), and the runners/ports 60 may be spaced apart from one another along the manifold axis P. The intake manifold 58 may also be elongated along the manifold axis P.

While example embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A charge air cooler system comprising:
  a manifold charge air cooler disposed within a plenum and defining a first chamber and a second chamber within the plenum, the first chamber operatively configured to be in fluid communication with a first bank of engine cylinders and the second chamber being in fluid communication with a second bank of engine cylinders;
  a first charge air cooler configured to cool a first ambient air flow, the first charge air cooler being in fluid communication with the first chamber; and
  a second charge air cooler configured to cool a second ambient air flow, the second charge air cooler being in fluid communication with the second chamber;
  wherein the manifold change air cooler is configured to cool an unsteady airflow between the first and the second chambers.
2. The charge air cooler system as defined in claim 1 wherein the first charge air cooler is in fluid communication with a first gas compressor configured to pressurize a first ambient airflow for delivery to the first chamber, the first charge air cooler being disposed between the first gas compressor and the first chamber.

3. The charge air cooler system as defined in claim 2 wherein the second charge air cooler is in fluid communication with a second gas compressor configured to pressurize a second ambient airflow for delivery to the second chamber, the second charge air cooler being disposed between the second gas compressor and the second chamber.

4. The charge air cooler system as defined in claim 3 further comprising a radiator operatively configured to cool an input coolant flow, the radiator being in fluid communication with an input of the manifold charge air cooler, a first output of the first charge air cooler, and a second output of the second charge air cooler.

5. The charge air cooler system as defined in claim 3 further comprising a radiator operatively configured to cool an input coolant flow, the radiator being in fluid communication with an input of the manifold charge air cooler, a first input of the first charge air cooler, and a second input of the second charge air cooler.

6. The charge air cooler system as defined in claim 5 wherein the radiator is in fluid communication with an output of the manifold charge air cooler, a first output of the first charge air cooler, and a second output of the second charge air cooler.

7. The charge air cooler system as defined in claim 6 further comprising a bypass valve upstream of the input of the manifold charge air cooler, the bypass valve being configured to redirect coolant flow away from the input of the manifold charge air cooler to the first and second inputs of the first and second charge air coolers.

8. An internal combustion engine comprising:
   an engine block defining a first bank and a second bank disposed across the first bank, each of the first and second banks having at least one cylinder;
   a cylinder head affixed to the engine block,
   an intake manifold affixed to the cylinder head, the intake manifold defining a plenum and a plurality of runners;
   a manifold charge air cooler disposed within the plenum and defining a first chamber and a second chamber within the plenum, the first chamber being in fluid communication with the first bank and the second chamber being in fluid communication with second bank;
   a first gas compressor configured to pressurize a first ambient airflow for delivery to the first bank via a first charge air cooler and the intake manifold, the first charge air cooler being disposed between the first gas compressor and the intake manifold; and
   a second gas compressor configured to pressurize a second ambient airflow for delivery to the second bank via a second charge air cooler and the intake manifold, the second charge air cooler being disposed between the second gas compressor and the intake manifold;
   wherein the manifold charge air cooler is operatively configured to cool an unsteady airflow between the first and second chamber and is in fluid communication with the first and second charge air coolers.

9. The internal combustion engine assembly as defined in claim 8 further comprising a radiator operatively configured to cool of an input coolant flow, the radiator being in fluid communication with an input of the manifold charge air cooler, a first output of the first charge air cooler, and a second output of the second charge air cooler.

10. The internal combustion engine assembly as defined in claim 8 further comprising a radiator operatively configured to cool of an input coolant flow, the radiator being in fluid communication with an input of the manifold charge air cooler, a first input of the first charge air cooler, and a second input of the second charge air cooler.

11. The internal combustion engine assembly as defined in claim 10 wherein the radiator is in fluid communication with an output of the manifold charge air cooler, a first output of the first charge air cooler, and a second output of the second charge air cooler.

12. The internal combustion assembly as defined in claim 9 wherein the manifold charge air cooler is configured to enable the unsteady airflow to pass between the first and second chambers.

13. The internal combustion engine assembly as defined in claim 12 wherein the manifold charge air cooler spans the entire length of the of intake manifold.

14. The internal combustion engine assembly as defined in claim 12 further comprising a baffle wall wherein the manifold charge air cooler and the baffle wall define the first and second chambers.

* * * * *